(12) United States Patent
Davis et al.

(10) Patent No.: US 10,144,186 B1
(45) Date of Patent: Dec. 4, 2018

(54) METHODS FOR MANUFACTURING SLIDE FASTENER WITH OVERMOLDED COMPONENTS

(71) Applicant: IDEAL FASTENER CORPORATION, Oxford, NC (US)

(72) Inventors: Gary Davis, Oxford, NC (US); William Mayo, Raleigh, NC (US)

(73) Assignee: IDEAL Fastener Corporation, Oxford, NC (US)

( * ) Notice: Subject to any disclaimer, the term of this patent is extended or adjusted under 35 U.S.C. 154(b) by 0 days.

(21) Appl. No.: 15/943,025

(22) Filed: Apr. 2, 2018

Related U.S. Application Data

(63) Continuation of application No. 14/520,512, filed on Oct. 22, 2014, now Pat. No. 9,944,028.

(60) Provisional application No. 61/895,221, filed on Oct. 24, 2013.

(51) Int. Cl.
 B29D 5/00 (2006.01)

(52) U.S. Cl.
 CPC ........ B29D 5/00 (2013.01); *B29K 2995/0008* (2013.01)

(58) Field of Classification Search
 CPC ... B29D 5/00; B29D 5/02; B29D 5/04; B29D 5/06; B29D 5/08; B29D 5/10; Y10S 160/18; Y10S 425/814; Y10S 190/903
 See application file for complete search history.

(56) References Cited

U.S. PATENT DOCUMENTS

| | | |
|---|---|---|
| 2,008,062 A | 7/1935 | Corner |
| 2,098,338 A | 11/1937 | Gilmore |
| 2,296,358 A | 9/1942 | Marinsky |
| 2,319,874 A | 5/1943 | Marinsky |
| 2,889,605 A | 6/1959 | Morin |
| 2,989,802 A | 6/1961 | McNamara |
| 3,081,462 A * | 3/1963 | Radovsky ............ A44B 19/60 2/265 |
| 3,225,429 A | 12/1965 | Fady |
| 3,309,746 A | 3/1967 | Carlile |
| 3,340,594 A | 9/1967 | Frohlich et al. |
| 3,482,292 A | 12/1969 | Frohlich |
| 3,488,239 A | 1/1970 | Heimberger |
| 3,490,098 A | 1/1970 | Frohlich |

(Continued)

FOREIGN PATENT DOCUMENTS

| | | |
|---|---|---|
| EP | 0875167 A2 | 11/1998 |
| JP | S50-058906 | 5/1975 |

(Continued)

OTHER PUBLICATIONS

Information Disclosure Statement (IDS) Letter Regarding Common Patent Application(s), dated Jun. 12, 2018.

*Primary Examiner* — Michael N Orlando
*Assistant Examiner* — Matthew Hoover
(74) *Attorney, Agent, or Firm* — David Higgins; Neal Wolgin; Tillman, Wright & Wolgin

(57) ABSTRACT

Zippers components such as a traditional pin and box assembly may be affixed to zipper stringer tapes by a simple injection molding process. When a non-traditional magnetic alignment assembly is used in place of a traditional pin and box assembly, other means are needed to adequately affix the components of the magnetic alignment assembly to the zipper stringer tapes in order to provide a durable finished zipper.

20 Claims, 3 Drawing Sheets

(56) References Cited

U.S. PATENT DOCUMENTS

| | | | |
|---|---|---|---|
| 3,605,208 A | 9/1971 | Carlile | |
| 3,768,125 A | 10/1973 | Frohlich | |
| 3,785,014 A | 1/1974 | Canepa | |
| 3,872,551 A | 3/1975 | Moertel | |
| 3,883,381 A | 5/1975 | Thaeler | |
| 3,925,858 A | 12/1975 | Thaeler | |
| 3,969,564 A | 7/1976 | Carder | |
| 4,023,241 A | 5/1977 | Kanzaka | |
| 4,034,445 A | 7/1977 | Stephens | |
| 4,100,656 A | 7/1978 | Moertel | |
| 4,238,872 A | 12/1980 | Akashi | |
| 4,362,487 A | 12/1982 | Takahashi | |
| 4,402,115 A | 9/1983 | Moertel | |
| 5,067,207 A | 11/1991 | Semons | |
| 5,596,793 A | 1/1997 | Davis | |
| 5,697,130 A | 12/1997 | Smith | |
| 5,806,163 A | 9/1998 | Shimai et al. | |
| 6,230,373 B1 * | 5/2001 | Wakai | A44B 19/00 24/381 |
| 6,502,285 B2 * | 1/2003 | Kiely | A44B 19/38 24/415 |
| 6,775,885 B1 * | 8/2004 | Wang | A44B 19/382 24/385 |
| 8,752,253 B2 | 6/2014 | Sato | |
| 8,997,263 B2 | 4/2015 | Damon et al. | |
| 9,398,789 B2 | 7/2016 | Blackford | |
| 9,944,028 B1 | 4/2018 | Davis et al. | |
| 2006/0008664 A1 | 1/2006 | Wakabayashi et al. | |
| 2007/0163091 A1 | 7/2007 | Bernasconi | |
| 2007/0169318 A1 | 7/2007 | Semons | |
| 2009/0049659 A1 | 2/2009 | Takani et al. | |
| 2011/0005042 A1 | 1/2011 | Thomas et al. | |
| 2011/0232047 A1 * | 9/2011 | Ogura | A44B 19/382 24/386 |
| 2012/0233739 A1 | 9/2012 | Blackford | |
| 2012/0260468 A1 | 10/2012 | Nozaki | |
| 2013/0232738 A1 * | 9/2013 | Tonninaga | A44B 19/32 24/435 |
| 2013/0269085 A1 | 10/2013 | Damon | |
| 2016/0073743 A1 | 3/2016 | Davis et al. | |

FOREIGN PATENT DOCUMENTS

| | | |
|---|---|---|
| JP | 2000253910 | 9/2000 |
| RU | 2277367 C2 | 6/2006 |
| RU | 2007112229 A | 10/2008 |
| WO | 2006103438 A1 | 10/2006 |
| WO | 2016040726 A1 | 3/2016 |

* cited by examiner

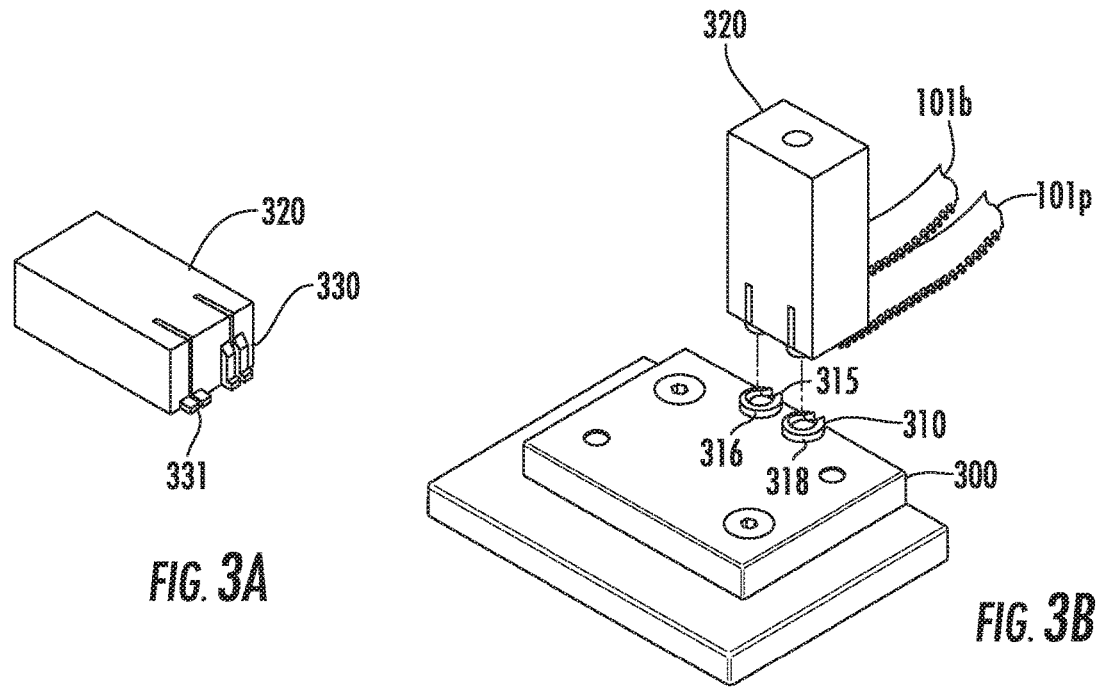
FIG. 3A
FIG. 3B
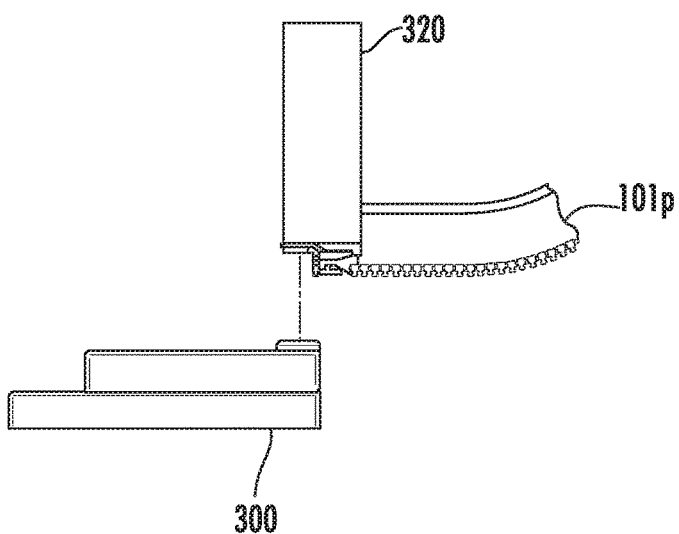
FIG. 3C

METHODS FOR MANUFACTURING SLIDE FASTENER WITH OVERMOLDED COMPONENTS

CROSS-REFERENCE TO RELATED APPLICATIONS

The present application is a U.S. continuation patent application of, and claims priority under 35 U.S.C. § 120 to, U.S. nonprovisional patent application Ser. No. 14/520,512, filed Oct. 22, 2014, which '512 application issued as U.S. Pat. No. 9,944,028 on Apr. 17, 2018, which '512 application and the patent issuing therefrom are each incorporated by reference herein, and which '512 application is a U.S. nonprovisional patent application of, and claims priority under 35 U.S.C. § 119(e) to, U.S. provisional patent application Ser. No. 61/895,221, filed Oct. 24, 2013, which provisional patent application is incorporated by reference herein.

COPYRIGHT STATEMENT

All of the material in this patent document is subject to copyright protection under the copyright laws of the United States and of other countries. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

Field of the Invention

The present invention relates generally to methods of manufacturing a slide fastener, or zipper, that includes features that allow the zipper ends to be joined without the need to insert a pin into a box.

Problem to be Solved

A typical separating-type zipper requires that the wearer insert a pin mounted on the end of one zipper stringer into a mating box on the other zipper stringer before the zipper slider can be pulled to join the zipper teeth of the two zipper stringers together thereby closing the zipper. This invention relates to methods used to manufacture a zipper with components that are over-molded to the zipper stringers. In one embodiment of the present invention, the over-molded components comprise zipper slider body guides and mounting surfaces for mounting a magnetic catch that is used in place of a traditional mating pin/box assembly. The magnetic catch is used to align the ends of the two zipper stringers, thereby allowing the wearer to pull the zipper slider without manually engaging a pin into a mating box. The invention disclosed relates to the means for manufacturing a zipper that comprises the necessary components of such a magnetic catch.

The invention enables the secure attachment of the separating components of a magnetic catch of a zipper in general, and in particular when the specific mechanical geometry of a unique magnetic catch requires the removal of the corded edge of the zipper stringer. The invention encompasses the engineering design of the machinery necessary to manufacture the components of the magnetic catch and the manufacturing process of affixing those components to the zipper stringers.

A semi-finished zipper comprises two zipper stringers of any given length. Each stringer comprises a tape, which is generally a continuous strip of woven fabric, a cord that is affixed to the inside edge of the tape, and zipper teeth that are affixed to the cord and the inside edge of the tape. The outer edge of the tape, sometimes referred to as the selvedge edge, is the edge that is affixed to a garment or other article, and the inner edge is the edge to which the teeth are affixed. In general, each tape has a bead cord made of twisted or woven yarn/thread that may be affixed to the inner edge of each tape, or a bead cord is formed along the inner edge as part of the process of weaving the zipper tape. In the case of a coil-type zipper, the cord is typically a separate cord that is sewn to the zipper tape during the process of sewing the coil-type teeth to the tape. In the case of a molded-type zipper, the cord is typically formed during the tape weaving process, and then the zipper teeth are molded over the corded inner edge of the tape. In either type of zipper, the bead cord gives the teeth something to hold on to and keep the teeth from being pulled off the tape by lateral forces (forces applied across the lateral cross section of the zipper). A zipper stringer is one zipper tape with the teeth affixed, and zipper chain is the term for an indeterminate length of the two zipper stringers with the opposing teeth enmeshed. A semi-finished zipper is a fixed length of zipper chain. In order to finish a semi-finished zipper, a zipper slider and pull are added to the chain, and optional top and/or bottom stops are affixed.

The corded inner edge of the zipper allows the zipper elements (teeth) and the separating components (pin and box) to be affixed securely to the zipper chain. Zipper chain without a corded edge is technically feasible, but will result in a zipper that has very poor lateral strength when the zipper is fastened. In some instances, it is necessary to remove a portion of the cord from the zipper chain, in which other means need to be enabled to attach the components of a traditional pin/box assembly or functionally similar components such as a magnetic catch.

This invention relates to methods used to manufacture a zipper with components that are over-molded to the zipper stringers. In one embodiment of the present invention, the over-molded components comprise zipper slider body guides and mounting surfaces for mounting a magnetic catch that is used in place of a traditional mating pin/box assembly. The magnetic catch is used to align the ends of the two zipper stringers, thereby allowing the wearer to pull the zipper slider without manually engaging a pin into a mating box. The invention disclosed relates to the means for manufacturing a zipper that comprises the necessary components of such a magnetic catch.

This methods disclosed facilitate the attachment of the over-molded components of a magnetic catch by certain design characteristics in the textile tape construction, the method of removing portions of the cord in the process of finishing a semi-finished zipper, and the method of attaching the magnetic catch components to form a finished zipper. Therefore, it is an objective of the present invention to create manufacturing methods for a slide fastener that has a molded magnetic catch that is mechanically affixed to the zipper chain by means that result in a finished zipper that possesses good lateral strength.

SUMMARY OF THE INVENTION

The zipper of the present invention accomplishes the above objectives as described below. The magnetic catch of the described zipper comprises two over-molded components, one for the "pin" side stringer and a second for the "box" side stringer. The "box" side is the zipper stringer that ordinarily has a box at the bottom end which prevents the slider body from being pulled off of the stringer. The "pin" side is the other zipper stringer that ordinarily has a pin at the bottom end. For a typical separating zipper, when the zipper is opened (the slider body is moved to the fully open position, which is at the pin/box assembly), the pin can be removed from the box, allowing the two zipper stringers to be fully disengaged.

This invention relates to methods used to manufacture a zipper with components that are over-molded to the zipper stringers. In one embodiment of the present invention, the over-molded components comprise zipper slider body guides and mounting surfaces for mounting a magnetic catch that is used in place of a traditional mating pin/box assembly. The magnetic catch is used to align the ends of the two zipper stringers, thereby allowing the wearer to pull the zipper slider without manually engaging a pin into a mating box. The invention disclosed relates to the means for manufacturing a zipper that comprises the necessary components of such a magnetic catch.

For the separating zipper described above that uses a magnetic catch, there is a first molded component that is over-molded to the "box" side zipper stringer, and a second molded component that is over-molded to the "pin" side zipper stringer. The two halves of the magnetic catch are later affixed to the over-molded components on the zipper stringers. In order to affix the over-molded components necessary for the attachment of the two halves of the magnetic catch, it is necessary to sever a portion of the cord. Since the severing of the cord from one or both stringers will result in a weakened zipper assembly that will quickly fail in use because it will not be able to resist the lateral forces present in a typical zipper installation. The manufacturing methods disclosed overcome the inherent weakness of a zipper with a severed cord.

The manufacturing methods disclosed will work with any type of molded zipper; however, the use a special cord results in a stronger zipper. Therefore, a braided cord is preferred over a plain twisted cord. A braided cord is preferably made from synthetic yarns formed from continuous synthetic filaments. A braided cord, unlike twisted yarn cords, consists of a chain of interlaced loops which by nature of the knitting process creates cavities in the surface of the yarn. A braided cord is inherently stronger than a twisted cord, but the cavities on the surface of a braided cord provide further benefits. The over-molded components necessary for the disclosed zipper are made from an acetal resin, and the cavities in the loops of yarn become receptors when the acetal resin is injected to form the over-molded components, thus enhancing the adhesion strength of the acetal to the zipper. Therefore, when the bead cord is partially severed (which is required by the design of the magnetic catch), it is very important to maximize the adhesion strength of the over-molded components to the remaining portion of the cord.

As discussed above, when the bead cord is severed and partially or fully removed from stringer tape (which is required to over-mold the components of the magnetic catch) the lateral strength of the finished zipper is compromised. Therefore, a further aspect of the present invention is to encapsulate the stringer tape in a manner that imparts good lateral strength to the finished zipper. This and other features of the present invention are disclosed below.

BRIEF DESCRIPTION OF THE DRAWINGS

One or more preferred embodiments of the present invention now will be described in detail with reference to the accompanying drawings, wherein the same elements are referred to with the same reference numerals.

FIGS. 3A-C illustrate means for affixing a magnetic catch to the ends of two zipper stringers.

Figure 1:
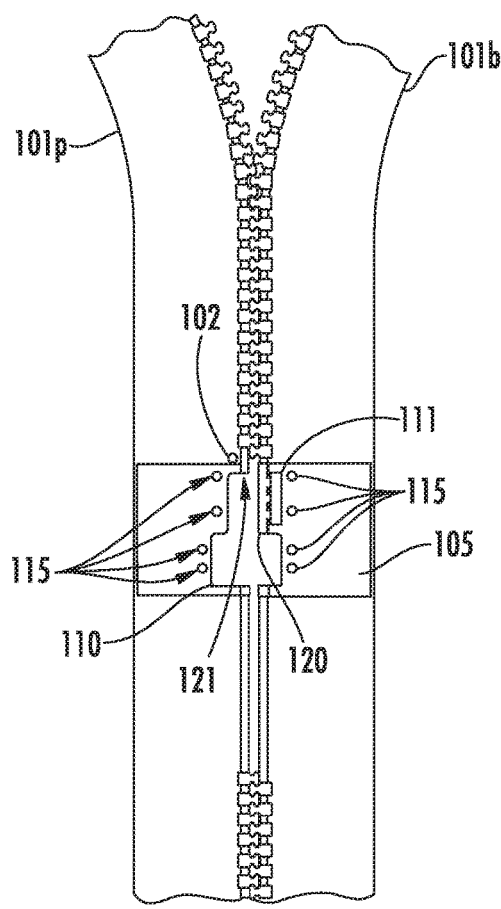
FIG. 1 illustrates a length of zipper chain showing a t-cut pattern and applied reinforcing film.

Referring now to the drawings, one or more preferred embodiments of the present invention are next described. The following description of one or more preferred embodiments is merely exemplary in nature and is in no way intended to limit the invention, its implementations, or uses.

DETAILED DESCRIPTION

As a preliminary matter, it will readily be understood by one having ordinary skill in the relevant art (an "Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended to, nor is to be construed to, limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

The manufacturing methods of the present invention relate to special methods of cutting, punching, over-molding, and affixing magnetic catch components to zipper chain. While the disclosed methods are directed towards a zipper with molded teeth, the methods also apply to zippers with other types of teeth. Referring now to the drawings, one or more preferred embodiments of the present invention are next described. The following description of one or more preferred embodiments is merely exemplary in nature and is in no way intended to limit the invention, its implementations, or uses.

In a preferred embodiment of the present invention, the fabric tapes of the zipper stringers have been woven with a braided cord on the inner edge of each zipper tape. A pair of zipper tapes is fed into a molding machine to mold the zipper teeth to the inner (corded) edge of the stringers, creating continuous lengths of zipper chain. Depending on the molding machine and the length of the tooth mold, all of the desired teeth may be molded in a single step, or the zipper tapes may need to be advanced through a mold two or more times until the desired number of teeth have been molded. A pre-determined gap is left between sections of molded teeth for further processing the stringers into finished zippers, such as adding a slider body and top and/or bottom stops. As the molded stringers exit the molding machine, the teeth on the two stringers are joined to create zipper chain. Up until this point, the process for making zipper chain is the same as for any typical molded zipper.

FIG. 1 illustrates zipper chain, with molded teeth affixed, showing a gap between sections of the molded teeth (the gapped area). As illustrated, the chain has undergone further processing in accordance with the methods of the present invention. For a conventional zipper, a reinforcing film is applied across the gapped area, and a "T-cut" is made in the gapped area through the reinforcing film area to allow a slider to be inserted and a pin and box to be affixed. A "T-cut" is a "T" shaped cutting of the stringers that is typically made by a die-cut punch. As illustrated in FIG. 1, the first step in the method of making the zipper is to apply a reinforcing film 105 across the front and rear surfaces of the stringers 101b and 101p, which such films are bonded to the stringers by adhesive. The next step is to punch a hole 102 through the "pin" stringer 101p. Reinforcing film, such as reinforcing film 105, is used in a conventional zipper to make it possible to make a clean T-cut using a die-cut punch through the zipper tapes, and to add stiffness to the cord to facilitate mounting the pin and box to the stringers. Reinforcing film 105 serves a similar purpose in the manufacture of the present zipper by means of the methods of the present invention.

Hole 102 is punched through the "pin" stringer 101p in the location across from the first tooth of the "box" stringer 101b. A heated punch is used to melt a clean hole 102 through the stringer as a cold punch would leave a frayed hole since the stringer tape is un-reinforced in this location. The reason the stringer tape is un-reinforced in this area is because reinforcing tape cannot be placed over any of the zipper teeth or the finished zipper cannot operate. While it would be possible to use a custom shaped reinforcing film that could cover the area where hole 102 is located, such a method of reinforcement would be impractical since reinforcing film is manufactured in fixed widths and is applied by machine from a continuous roll of reinforcing film material. The significance of a clean cut hole 102 will become apparent below.

The next step is to make a modified T-cut 110 thorough the stringer tapes 101b and 101p, and a slot 111 thorough stringer tape 101b. Holes 115 are then cold-punched by a die-cut punch. Referring back to FIG. 1, it can be seen that a significant portion of the bead cord 120 remains on stringer 101b, but only a very small portion of the bead cord 121 remains on stringer 101p.

Figure 2:
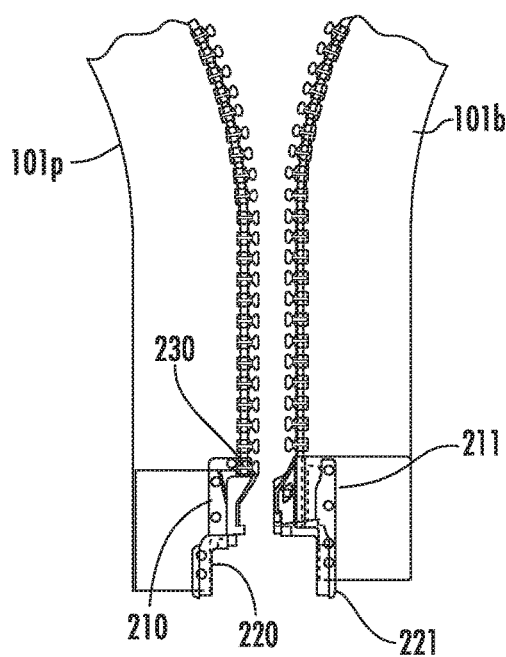
FIG. 2 is an illustration of a semi-finished zipper showing over-molded components molded to the cut ends of the stringers of FIG. 1.

FIG. 2 illustrates a semi-finished zipper showing over-molded components molded to the cut ends of the stringers of FIG. 1. Continuing the manufacturing method of the present invention, the zipper chain is cut to the desired length of the finished zipper, and the stringers 101p and 101b are partially pulled apart to separate the ends of the T-cut. The ends of the stringers 101b and 101p are placed in a molding machine where acetal resin is injected to form the over-molded components on the stringers. The over-molded components provide a mounting base for the barrels that contain the magnets of the magnetic catch, and also provide physical guides to allow the zipper slider to engage the zipper teeth and to align the two stringers when the magnetic catch engages. The over-molded components 210 and 211 are molded on both flat surfaces of the zipper stringers, and the acetal resin flows through the holes 102 and 115, facilitating the bonding of the two sides of the over-molded components together, and the resin encapsulates the fabric tapes of the stringers. The combination of the resin flowing through the holes 102 and 115, and the permeation of the resin into the surface of the fabric tapes, interlocks the two sides of the over-mold. The size of T-cut 110 and the size and location of the holes 102 and 115 are of such design so as to provide the necessary strength of attachment of the over-molded components, but without detriment to the appearance or function of the over-molded components.

The over-molded component 211 on stringer 101b includes a flat surface 221, and the over-molded component 210 on stringer 101p includes a flat surface 220. The flat surfaces 220 and 221 are perpendicular to the surface of the stringer tapes and parallel to the longitudinal axis of the stringer tapes. The over-molded component 210 on stringer 101p also includes a specially shaped tooth 230 that is an important feature for the proper operation of the finished zipper. This tooth 230 is formed over hole 102 and partial bead cord 121, and the strength of tooth 230 is highly dependent on the resin flowing smoothly through hole 102 at the time of the over-molding process. The requirement that the resin flow smoothly through hole 102 is the reason that hole 102 must be precisely formed with a heated punch. Using a cold die to cut hole 102 (in the area of the stringer 101p where there is no reinforcing film) is ineffective because such holes do not maintain their shape as the warp and weft yarns fray and are interlaced symmetrically. The looseness of the weave pattern allows the yarns to creep, thus partially or completely blocking the closing the hole. Using a heated punch, such as a hot needle, seals the edges of the hole and the desired diameter of the hole is obtained with precision.

The over-molded components can be of any suitable shape that allows the magnetic catch to operate properly. The over-molded components can comprise one of more pieces. In the manufacturing process described herein, the barrels that hold the magnets of the magnetic catch are injection molded separately and affixed to the over-molded components as shown below. It is also possible to over-mold the barrels as an integral part of the over-molding process. The over-mold design can be of a wide variety depending on the size, shape, and end use of the zipper. In addition, a wide variety of secondary components can be attached to the over-mold either by ultrasonic welding, adhesives, mechanical interlock, and the like.

FIGS. 3A, 3B, and 3C illustrate an ultrasonic horn and an anvil used for affixing a magnetic catch to the ends of two zipper stringers. In one embodiment of the zipper manufactured by the method of the present invention, a magnet is inserted into each of two barrel shaped extrusions, and one of the barrels is affixed to each of the over-molded components of the two zipper stringers. In one embodiment of the present invention, an anvil 320 is suitably enabled to accept the over-molded component 211 on stringer 101b in a first slot 331, and the over-molded component 210 on stringer 101p in a second slot 330. FIG. 3A shows a bottom perspective view of anvil 320 that clearly shows a first slot 331 and a second slot 330. FIG. 3B shows a different perspective view of anvil 320 with stringer 101p mounted in second slot 330 and stringer 101b mounted in first slot 331, as well as ultrasonic horn 300 which is shown with cavities 310 and 315. Cavity 310 is designed to hold a barrel 311, and cavity 315 is designed to hold a barrel 316. FIG. 3C illustrates a side view of anvil 320 with stringer 101p mounted in second slot 330, and the vertical axis along which ultrasonic horn 320 moves as it mates against ultrasonic horn 300 in preparation of the ultrasonic welding process.

In the method of the present invention, molded barrels 311 and 316 are placed in cavities 310 and 315 of ultrasonic horn 300 respectively, and stringers 101p and 101b are placed in second slot 330 and first slot 331 of anvil 320 respectively. Stringers 101p and 101b are placed in a manner such that flat surfaces 220 and 221 (as illustrated in FIG. 2) face downward towards ultrasonic horn 300. A magnet is then placed inside each of barrels 311 and 316. Anvil 320 is then moved down to bear on ultrasonic horn 300, and anvil 320 is energized, resulting in barrels 311 and 316 being ultrasonically welded to flat surfaces 220 and 221 respectively. Anvil 320 is then moved upward, and stringers 101b and 101p are removed.

Figure 4:
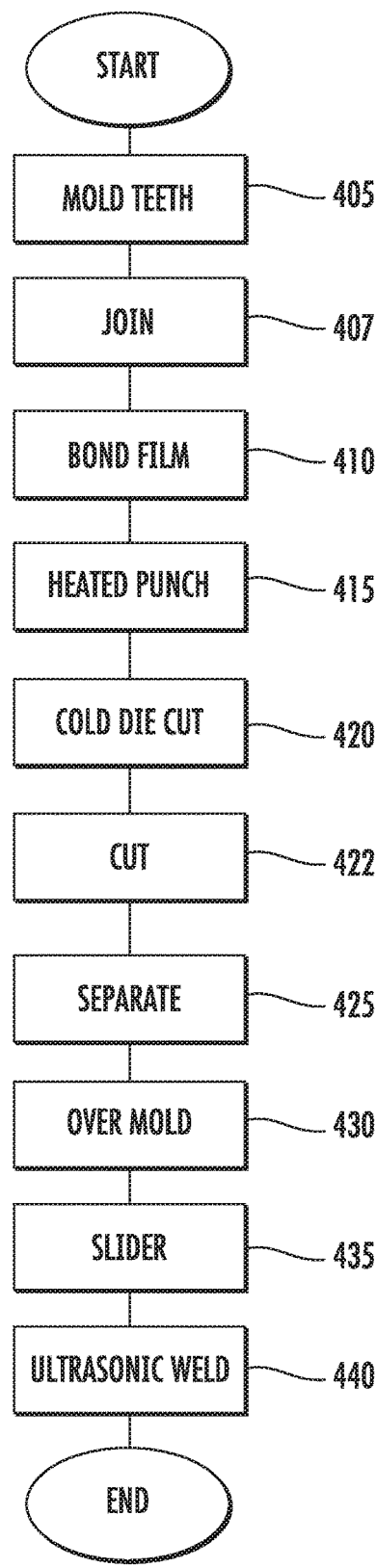
FIG. 4 is a flowchart of the manufacturing method of the present invention.

FIG. 4 is a flowchart of the manufacturing method of the present invention. The process starts as two continuous lengths of fabric tape are moved into a mold where plastic teeth are molded to the beaded inner edge of both tapes at step 405. Depending on the length of the desired finished zipper, the tapes may be re-positioned one or more times in the mold to mold the desired length of molded teeth. Proceeding to step 407, the teeth of the two stringers are joined together for further processing. At step 410, the tapes are moved through the mold to a station where a reinforcing film is applied over one or both sides of the zipper tapes and bonded thereto by adhesive or other means. The reinforcing film may be applied from a continuous roll of film that is fed in a direction perpendicular to the longitudinal length of the zipper tapes. At step 415, a heated punch or heated needle is pressed through the "pin" stringer tape to form a hole in an area of the "pin" stringer that is not under the reinforcing film applied in step 410. At step 420, a series of holes and a T-cut are made in the area of both stringers that is under the reinforcing film applied in step 410. The series of holes and the T-cut may be made with a single punch or multiple punches as a specific design dictates. Proceeding to step 422, the stringers are cut to the length of the desired finished zipper to form a semi-finished zipper. At step 425, the teeth of the two stringers are separated at the end of the stringers with the reinforcing film applied, and the ends are then inserted into a mold. At step 430, additional components are over-molded to the stringer tapes. At step 435, a zipper slider body is installed on the "box" stringer. At step 440, the over-molded ends of zipper stringers are placed in an anvil and pre-formed barrels are placed in a mating ultrasonic horn. Magnets are placed inside of each barrel, and the ultrasonic horn is brought to bear against the anvil. The ultrasonic horn is then energized, thereby welding the barrels to the over-molded components of the semi-finished zipper. The now finished zipper is removed from the anvil, and the process ends.

What is claimed is:

1. A method of manufacturing a zipper with over-molded components and magnetic catches, the method comprising the steps of:
   providing a length of zipper chain comprising a pair of stringer tapes, each stringer tape having a row of plastic teeth molded along a beaded inner edge, wherein the rows of plastic teeth are at least substantially interlocked with one another;
   applying a reinforcing film to at least one flat surface of the pair of stringer tapes;
   forming at least one first aperture through a first of the pair of stringer tapes in an area adjacent to, but not covered by, the reinforcing film;
   forming a plurality of second apertures through an area of both stringer tapes that is covered by the reinforcing film;
   cutting the length of zipper chain, through an area of the zipper chain at least partially covered by the reinforcing film, to a desired length, so as to define a pair of reinforced stringer tape ends;
   molding a mounting component to each of the pair of reinforced stringer tape ends, wherein a molding resin is permitted to fill the at least one first aperture and at least one of the plurality of second apertures; and
   securing a magnetic catch component to each mounting component.

2. The method of claim 1, further comprising the step of mounting a slider body to one of the pair of stringer tapes.

3. The method of claim 1, wherein the reinforcing film is applied with an adhesive.

4. The method of claim 1, wherein the at least one first aperture is formed proximate to a cord of the first stringer tape.

5. The method of claim 4, wherein the at least one first aperture is formed using a hot needle.

6. The method of claim 1, wherein at least one of the plurality of second apertures is a T-cut.

7. The method of claim 6, wherein the T-cut at least partially severs the beaded inner edge of each stringer tape.

8. The method of claim 6, wherein the T-cut is formed using a punch.

9. The method of claim 1, wherein at least one of the plurality of second apertures is a slotted opening.

10. The method of claim 9, wherein, during the step of molding the mounting components, the slotted opening is filled with the molding resin.

11. The method of claim 1, wherein each magnetic catch component includes a barrel that partially surrounds a magnet.

12. The method of claim 11, wherein the step of securing the magnetic catch component to each mounting component includes:
   positioning the mounting components in an anvil;
   positioning the barrels in an ultrasonic horn;
   maneuvering the anvil to be in contact with the ultrasonic horn; and
   energizing the ultrasonic horn, thereby welding each barrel to a respective mounting component.

13. The method of claim 1, wherein each mounting component includes a barrel having a cavity shaped to receive a magnet.

14. A method of manufacturing a zipper with over-molded components and magnetic catches, the method comprising the steps of:
   providing a cut length of zipper chain comprising first and second stringer tapes, each stringer tape having a row of plastic teeth molded along a beaded inner edge and a lower end reinforced with a reinforcing film;
   molding a mounting component to each reinforced lower end, wherein a molding resin is permitted to fill a plurality of apertures extending through each of the first and second stringer tapes; and
   securing a magnetic catch component to each mounting component, wherein each magnetic catch component includes a barrel that partially surrounds a magnet.

15. The method of claim 14, further comprising the step of mounting a slider body to one of the first and second stringer tapes.

16. The method of claim 14, wherein at least one of the plurality of apertures extending through the first stringer tape is located in an area adjacent to, but not covered by, the reinforcing film.

17. The method of claim 14, wherein at least one of the plurality of apertures extending through the second stringer tape is a slotted opening.

18. The method of claim 14, wherein the step of securing the magnetic catch component to each mounting component includes:
   positioning the mounting components in an anvil;
   positioning the barrels in an ultrasonic horn;
   maneuvering the anvil to be in contact with the ultrasonic horn; and
   energizing the ultrasonic horn, thereby welding each barrel to a respective mounting component.

19. A method of manufacturing a zipper with over-molded components and magnetic catches, the method comprising the steps of:
   providing a cut length of zipper chain comprising first and second stringer tapes, each stringer tape having a row of plastic teeth molded along a beaded inner edge and lower ends reinforced with a reinforcing film;
   molding a mounting component to each reinforced lower end;
   positioning the mounting components in an anvil;
   positioning first and second barrels in an ultrasonic horn, wherein each barrel partially surrounds a magnet;
   maneuvering the anvil to be in contact with the ultrasonic horn; and
   energizing the ultrasonic horn, thereby welding each barrel to a respective mounting component.

20. The method of claim 19, further comprising the step of mounting a slider body to one of the first and second stringer tapes.

* * * * *